(12) United States Patent
Nishita

(10) Patent No.: US 6,726,371 B2
(45) Date of Patent: Apr. 27, 2004

(54) APPARATUS FOR FIXING A COATED OPTICAL FIBER TO AN OPTICAL FIBER FIXTURE

(75) Inventor: Naoki Nishita, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 133 days.

(21) Appl. No.: 10/032,331

(22) Filed: Dec. 19, 2001

(65) Prior Publication Data

US 2002/0114585 A1 Aug. 22, 2002

(30) Foreign Application Priority Data

Sep. 29, 2000 (JP) ........................... 2000-299815
Sep. 26, 2001 (WO) .................... PCT/JP01/08385

(51) Int. Cl.⁷ .............................. G02B 6/36; G02B 6/38
(52) U.S. Cl. ............................................ 385/81; 385/62
(58) Field of Search ........................... 385/81, 62, 88, 385/60, 72, 78; 439/139, 140

(56) References Cited

U.S. PATENT DOCUMENTS 6,179,482 B1 * 1/2001 Takizawa et al. ............. 385/81
6,527,451 B2 * 3/2003 Asada .......................... 385/58

FOREIGN PATENT DOCUMENTS

| JP | 64-088406 | 4/1989 |
| JP | 7-544595  | 2/1990 |
| JP | 05-060945 | 3/1993 |

OTHER PUBLICATIONS

International Search Report for International Application No. PCT/JP01/08385. having a date of mailing of Dec. 18, 2001.

* cited by examiner

Primary Examiner—Chandrika Prasad
(74) Attorney, Agent, or Firm—Knobbe, Martens, Olson & Bear LLP

(57) ABSTRACT

A simple, low-cost fixing structure capable of surely fixing an optical fiber to an optical fiber fixture. A ferrule (1) is formed with an optical fiber insertion hole (2) penetrating from the tip end side thereof to the back end side and an opening (4) communicating from the side of the ferrule to the optical fiber insertion hole (2). A plastic optical fiber (3) is inserted into the optical fiber insertion hole (2). A gutter-like optical fiber fixing component (5) having optical fiber clamping parts (6) facing each other is inserted into the opening (4). Then, the plastic optical fiber (3) is clamped from both sides between inner wall surfaces (7) of the optical fiber clamping parts (6), outer surfaces (9) of the optical fiber clamping parts (6) of the optical fiber fixing component (5) is pressure welded with inner wall surfaces (8) of the opening (4), and the plastic optical fiber (3) is fixed and prevented from falling off from the ferrule (1).

11 Claims, 4 Drawing Sheets

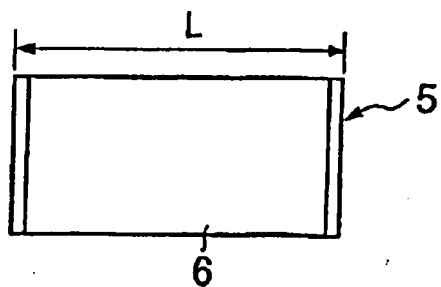
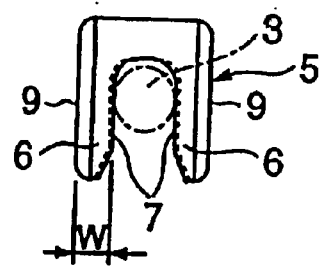
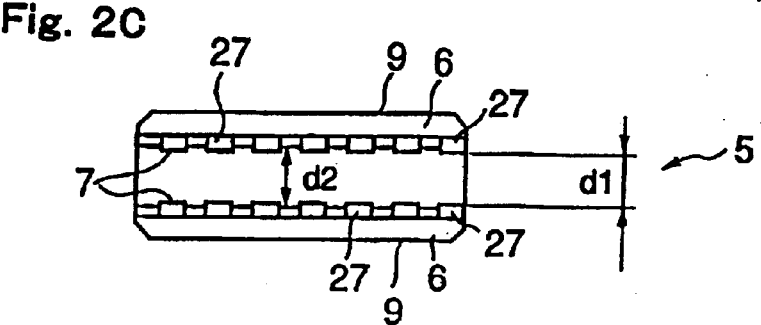
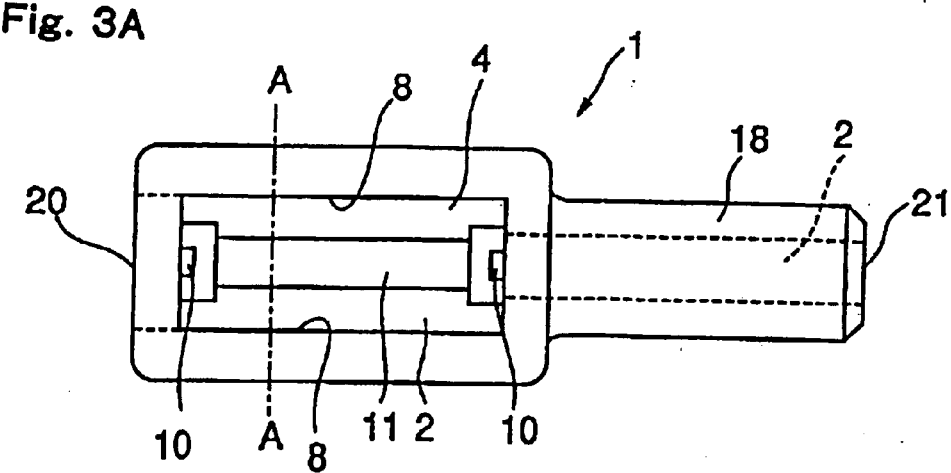
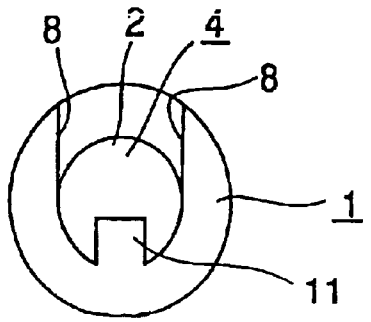

APPARATUS FOR FIXING A COATED OPTICAL FIBER TO AN OPTICAL FIBER FIXTURE

This application claims priority under 35 U.S.C. Sections 120 and 365 to International Application No. PCT/JP01 08385, filed on Sep. 26, 2001, which published in the Japanese language as International Publication No. WO 02 29462 A1 on Apr. 11, 2002. The disclosure of the international application is hereby incorporated by reference in its entirety.

TECHNICAL FIELD

The invention relates to an optical fiber fixing structure for fixing a coated optical fiber such as a coated plastic optical fiber to an optical fiber fixture such as a ferrule or connector.

BACKGROUND OF THE INVENTION

In recent years, with the realization of faster signal processing for personal computers or LANs (local area networks) and the diversification of services, the realization of faster signal transmission rates has been proceeding. Additionally, with the dramatic development of computerization in vehicles, for example, displaying a vehicle location on a map using a car navigation system and management for solving traffic congestion or the like utilizing the ITS (Intelligent Transport Systems) are conducted. With such computerization, communication information throughput such as data, image and voice in vehicles has been increasing.

As described above, when the realization of faster signal transmission rates and the increased communication information throughput proceed, an influence of noises in communications has been growing. On this account, plastic optical fibers (coated plastic optical fibers) capable of reducing the influence of noises have been used in signal transmission lines.

Generally, the plastic optical fiber is provided with a sheath such as nylon. As forms of sheaths, there is multilayer sheath where a first sheath such as nylon is disposed around the outer periphery of a plastic optical fiber strand and a second sheath such as nylon is further disposed around the outer periphery of the first sheath. When the plastic optical fiber is used as a high bit-rate signal transmission line, for example, in a state that the sheath at the connection end face side is removed to expose the plastic optical fiber strand or the second sheath or more is removed to expose the first sheath, this exposed portion and the coated portion are inserted and fixed to an optical fiber fixture such as a ferrule or connector. The optical fiber fixture is formed with a proper optical fiber insertion hole.

As one example of the fixing structure for the aforesaid plastic optical fiber, a structure is known that a plastic optical fiber is inserted into an optical fiber insertion hole of a metal or a resin ferrule and the plastic optical fiber is fixed to the ferrule with an adhesive such as an epoxy resin.

Additionally, a structure is proposed that a plastic optical fiber is fixed to a ferrule by crimping the ferrule in a state that the plastic optical fiber is inserted into an optical fiber insertion hole of a metal ferrule.

Furthermore, as another example, a structure is proposed that in a state that a plastic optical fiber is inserted into an optical fiber insertion hole of a ferrule made of a transparent resin, laser light is irradiated from the outside of the ferrule to weld the resin of the ferrule with a sheath resin of the plastic optical fiber and thereby the plastic optical fiber is fixed to the ferrule.

Moreover, as proposed in Japanese Utility Model Laid-Open (No. 42836/1992), a structure is proposed that a plastic optical fiber (coated plastic optical fiber) 3 is fixed to a ferrule using a metal member 15 as shown in FIG. 6A, for example.

This fixing structure is that the plastic optical fiber 3 inserted into an optical fiber insertion hole of the ferrule is supported by the metal member 15 and is fixed and prevented from falling off from the ferrule so that the plastic optical fiber 3 does not fall off from the ferrule even though tensility is applied the plastic optical fiber 3 in the longitudinal direction thereof.

FIG. 6B depicts a diagram illustrating a state of fixing the plastic optical fiber 3 by the metal member 15 that is seen from the under side of the plastic optical fiber 3. As shown in FIG. 6B, the support for the plastic optical fiber 3 by the metal member 15 is conducted in which clamping parts 16 of the metal member 15 provide point contacts at each supporting position with a space in the longitudinal direction of the plastic optical fiber 3.

However, when the structure of fixing the optical fiber to the ferrule using the adhesive such as the epoxy resin as described above, there has been a problem that handling the adhesive is troublesome and curing the adhesive takes time.

Additionally, when the fixing structure of crimping the metal ferrule is adapted, the ferrule must be made of metal and there has been a problem of high costs because metal is more expensive than plastic.

Furthermore, when the fixing structure is adapted that the ferrule resin is welded with the sheath resin of the plastic optical fiber using laser light, there has been a problem that equipment expenses are required because laser irradiation facilities are needed.

Moreover, when the fixing structure shown in FIGS. 6A and 6B is adapted, the metal member 15 might damages the core of the plastic optical fiber 3 in case where the dimensional accuracy of the metal member 15 is not controlled strictly. Once the core is damaged, there has been a problem that a transmission loss of the plastic optical fiber 3 is increased.

In one aspect of the invention, it is to provide an optical fiber fixing structure capable of fixing a coated optical fiber such as a plastic optical fiber to an optical fiber fixture easily with low costs and causing no increase in a transmission loss of the coated optical fiber.

DISCLOSURE OF THE INVENTION

The invention is to provide an optical fiber fixing structure having the following configuration. That is, an optical fiber fixing structure of the invention for fixing a coated optical fiber to an optical fiber fixture, the optical fiber fixing structure is characterized in that the optical fiber fixture is formed with an optical fiber insertion hole penetrating from a tip end side thereof to a back end side and an opening communicating from a side of the optical fiber fixture to the aforesaid optical fiber insertion hole, wherein the coated optical fiber is inserted into the aforesaid optical fiber insertion hole, an optical fiber fixing component having optical fiber clamping parts facing each other is inserted and fit to the aforesaid opening as clamping tip end sides of the aforesaid optical fiber clamping parts are faced to a side of the aforesaid coated optical fiber, the coated optical fiber is clamped from both sides by the optical fiber fixing component as an outer periphery of the aforesaid coated optical fiber is clamped between inner wall surfaces of the optical fiber clamping parts facing each other of the aforesaid optical fiber fixing component, outer surfaces of the optical fiber clamping parts of the aforesaid optical fiber fixing component are pressure welded with inner wall surfaces of the opening of the aforesaid optical fiber fixture, and the aforesaid coated optical fiber is fixed and prevented from falling off from the aforesaid optical fiber fixture.

As one exemplary embodiment, a space of the optical fiber clamping parts of the optical fiber fixing component is formed smaller than the outer diameter of the coated optical fiber and the aforesaid optical fiber clamping parts are formed to be optical fiber pressing parts for clamping and holding the coated optical fiber from both sides.

As one example, the optical fiber fixing component is a gutter-like component having a U-shaped cross section, where the optical fiber clamping parts are extended from both sides of a base part and faced each other.

As a preferable example of the fixing structure for the coated optical fiber, it is a unbonded clamping and fixing structure where the coated optical fiber is pressure welded and fixed between the optical fiber clamping parts of the optical fiber fixing component without using an adhesive and the optical fiber fixing component is pressure welded and fixed between the inner wall surfaces of the opening of the optical fiber fixture without using an adhesive.

Preferably, the optical fiber clamping parts of the optical fiber fixing component are formed with bumps and dips in the inner wall surfaces thereof.

The bumps and dips in the inner wall surfaces of the optical fiber clamping parts of the optical fiber fixing component may be formed to have a plurality of fins that are spaced each other and extended slantly in the direction of inserting the optical fiber.

The optical fiber fixture is formed to be a cylindrical ferrule or a connector provided with one or more cylindrical ferrules and the cylindrical bore of the aforementioned cylinder may be the optical fiber insertion hole.

As one example, in the opening of the optical fiber fixture, inner wall surfaces facing to the optical fiber clamping parts of the optical fiber fixing component are formed to be straight surfaces.

The entrance of the opening of the optical fiber fixture may be formed with projecting parts for preventing the optical fiber fixing component from falling off.

Preferably, at least the optical fiber fixing component of the optical fiber fixture and the optical fiber fixing component is formed of plastic.

As one example, the coated optical fiber is a coated plastic optical fiber where a sheath is formed around the outer periphery of a plastic optical fiber strand.

BRIEF DESCRIPTION OF THE DRAWINGS

FIGS. 2A, 2B and 2C depict diagrams illustrating an optical fiber fixing component adapted to the embodiment from the side, the front and the bottom, respectively;

FIGS. 3A and 3B depict illustrations of a ferrule adapted to the embodiment;

BEST MODE FOR CARRYING OUT THE INVENTION

In order to describe the invention in more detail, it will be described with reference to the accompanying drawings. Additionally, in the description of the following embodiments, the parts having the same designation as the orthodox example are designated the same numerals and signs, omitting or simplifying the overlapping description.

Figure 1A:
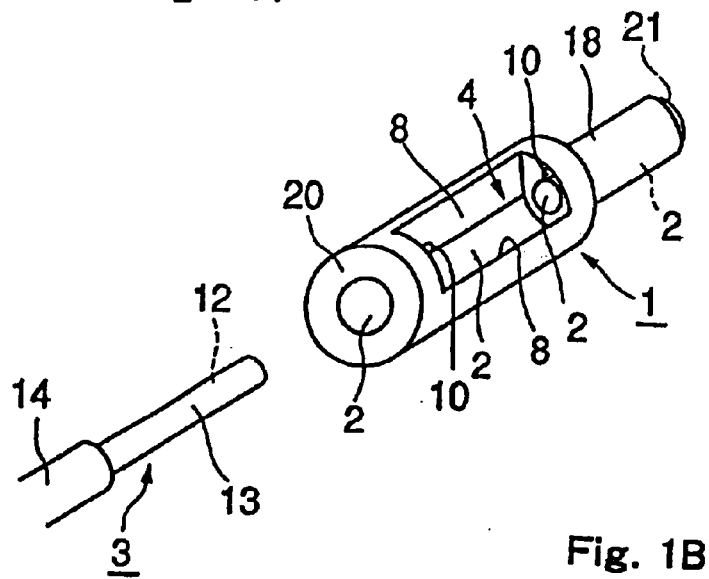
FIGS. 1A, 1B and 1C depict illustrations showing one embodiment of the optical fiber fixing structure in the invention by the fixing work process.
Figure 1B:
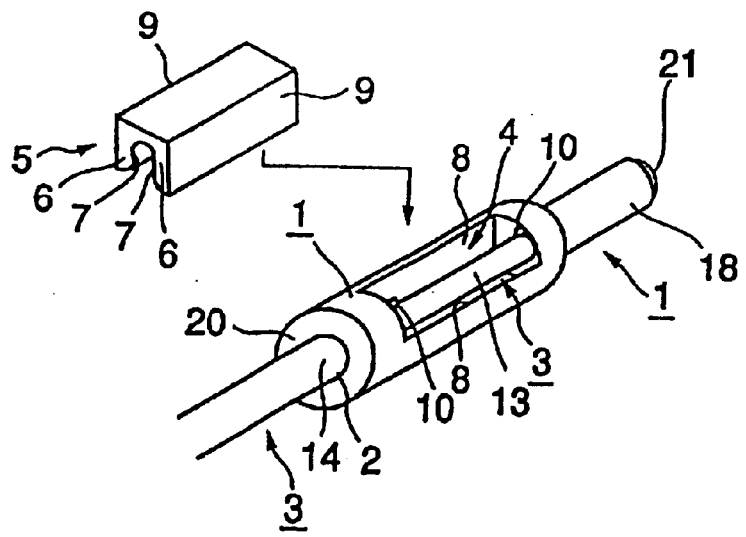
Figure 1C:
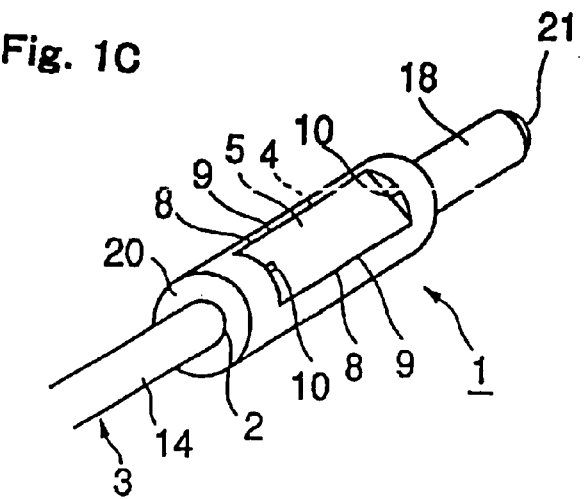
Figure 4:
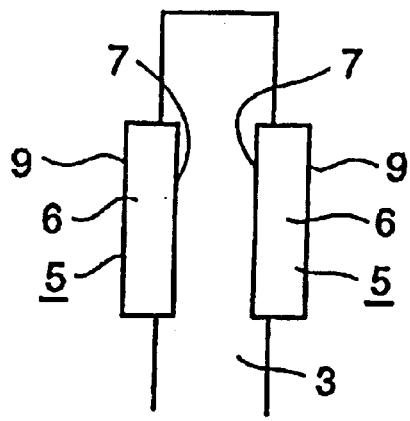
FIG. 4 depicts a diagram illustrating a state of a plastic optical fiber being clamped by the optical fiber fixing component in the embodiment, which is seen from the under side.

FIG. 1C depicts one example of the optical fiber fixing structure in the invention. FIGS. 1A and 1B depict the optical fiber fixing work process for obtaining the fixing structure.

As shown in these drawings, the optical fiber fixing structure of one embodiment in the invention is an optical fiber fixing structure where a plastic optical fiber (coated plastic optical fiber) 3 as a coated optical fiber is fixed to a ferrule 1 as an optical fiber fixture. In order to fix the plastic optical fiber 3 to the ferrule 1, an optical fiber fixing component 5 having a distinguishing gutter shape shown in FIG. 1B is used in this example.

As shown in FIG. 1A, the plastic optical fiber 3 is formed in which a first sheath 13 is formed around the outer periphery of a plastic optical fiber strand 12 and a second sheath 14 is further formed around the outer periphery thereof. In the plastic optical fiber 3, the second sheath 14 on the connection end face side is removed to expose the surface of the first sheath 13. In the example shown here, the diameter of the first sheath 13 is 1.51 mm, and the diameter of the second sheath 14 is 2.3 mm.

The aforesaid optical fiber fixing component 5 shown in FIG. 1B is formed of plastic such as a PBT (polybutylene terephthalate), for example. The side view of the optical fiber fixing component 5 is shown in FIG. 2A. The front view of the optical fiber fixing component 5 is shown in FIG. 2B. The diagram of the optical fiber fixing component 5 seen from the under side is shown in FIG. 2C.

As shown in FIGS. 1B, 2B and 2C, the optical fiber fixing component 5 has optical fiber clamping parts 6 facing each other. The optical fiber clamping parts 6 facing each other are extended from both sides of a base part (walls of the base) of the optical fiber fixing component 5 in parallel in the vertical direction. The shape of the cross section (a section in the direction orthogonal to the longitudinal direction) of the optical fiber fixing component 5 is U-shaped. Inner wall surfaces 7 of the optical fiber clamping parts 6 are formed with a plurality of rectangular bumps 27; bumps and dips are formed on the aforementioned inner wall surfaces 7. Of course, the shapes of the bump 27 may be other shapes except a rectangular shape.

A distance d1 between the optical fiber clamping parts 6 of the optical fiber fixing component 5 is 1.2 mm, and a distance d2 is 1.4 mm in the example shown here. These distances d1 and d2 are formed smaller than the outer diameter of the plastic optical fiber 3 (here, it is the outer diameter of the first sheath 13 of 1.51 mm). The optical fiber clamping parts 6 are formed to be optical fiber pressing parts. In the example shown here, a length L of the optical fiber fixing component 5 is 7 mm and a width W of the optical fiber clamping part 6 is 0.5 mm.

A plan view of the aforesaid ferrule 1 is shown in FIG. 3A. An A—A section thereof is shown in FIG. 3B. As shown in FIGS. 1A to 1C, 3A and 3B, the ferrule 1 is formed with an optical fiber insertion hole 2 penetrating from the tip end 21 side to the back end 20 side and an opening 4 communicating from the side of the ferrule 1 to the aforementioned optical fiber insertion hole 2. In the example shown here, the ferrule 1 is formed into a cylindrical shape and the cylindrical bore thereof is formed to be the optical fiber insertion hole 2.

In the opening 4 of the ferrule 1, inner wall surfaces 8 facing to the optical fiber clamping parts 6 of the aforesaid optical fiber fixing component 5 are formed to be straight surfaces. The entrance of the opening 4 of the ferrule 1 is formed with two projecting parts 10 for preventing the optical fiber fixing component 5 from falling off. Additionally, the bottom of the opening 4 is formed with an optical fiber supporting part 11 extended upward (the entrance side of the opening 4).

The inner diameter of the optical fiber insertion hole 2 formed in a cylindrical part 18 on the tip end 21 side of the ferrule 1 is formed slightly greater than the outer diameter of the first sheath 13 of the plastic optical fiber 3, which is formed so as to smoothly insert the plastic optical fiber 3.

Next, an assembly for fixing the plastic optical fiber 3 to the ferrule 1 will be described.

As shown in FIG. 1A, the plastic optical fiber 3 is inserted into the optical fiber insertion hole 2 from the back end 20 side of the ferrule 1 in a state that the second sheath 14 on the connection end face side is removed to expose the first sheath 13. Then, it becomes as shown in FIG. 1B and the connection end face of the plastic optical fiber 3 is in a state of being exposed on the tip end 21 side of the ferrule 1.

The optical fiber fixing component 5 is inserted into the opening 4 of the ferrule 1 with the optical fiber clamping parts 6 faced to the plastic optical fiber 3 side, and it is fit as shown in FIG. 1C.

The optical fiber fixing component 5 is thus inserted and fit to the opening 4 and then the optical fiber fixing component 5 allows each of the inner wall surfaces 7 of the optical fiber clamping parts 6 to contact the outer periphery of the plastic optical fiber 3 and to pressure weld and clamp the plastic optical fiber 3 from both sides, as shown in FIGS. 2B and 3. Additionally, the outer surfaces 9 of the optical fiber clamping parts 6 of the optical fiber fixing component 5 are pressure welded with the inner wall surfaces 8 of the opening 4 of the aforementioned ferrule 1.

Then, according to the clamping, the optical fiber fixing component 5 is fixed to the ferrule 1 and the plastic optical fiber 3 clamped by the optical fiber fixing component 5 is fixed and prevented from falling off from the ferrule 1.

In the embodiment shown here, one action performance that only inserts the optical fiber fixing component 5 into the opening 4 of the ferrule 1 can achieve fixing the plastic optical fiber 3 to the optical fiber clamping parts 6 and fixing the optical fiber fixing component 5 to the ferrule 1 at the same time without using an adhesive.

According to the embodiment, the plastic optical fiber 3 is clamped from both sides in a state that each of the inner wall surfaces 7 of the optical fiber clamping parts 6 of the optical fiber fixing component 5 is allowed to be line or surface contacted in the longitudinal direction in the outer periphery of the plastic optical fiber 3. On this account, even though a greater tensility is applied to the plastic optical fiber 3, the optical fiber fixing component 5 can clamp the plastic optical fiber 3 firmly and the plastic optical fiber 3 can be fixed and prevented from falling off from the ferrule 1.

Additionally, according to the embodiment, the optical fiber fixing component 5 is only inserted and fit to the opening 4 of the ferrule 1 inserted with the plastic optical fiber 3 and thereby the plastic optical fiber 3 can be fixed to the ferrule 1 without using an adhesive. Thus, the fixing work for the plastic optical fiber 3 can be conducted extremely easily.

Furthermore, clamping the plastic optical fiber 3 by the optical fiber fixing component 5 is conducted in the state that the optical fiber clamping parts 6 of the optical fiber fixing component 5 allow the inner wall surfaces 7 to be line or surface contacted in the longitudinal direction of the plastic optical fiber 3. Therefore, the optical fiber fixing component 5 does not damage the core of the plastic optical fiber 3 and does not cause an increase in a transmission loss of the plastic optical fiber 3.

Particularly, according to the embodiment, the distance between the optical fiber claming parts 6 of the optical fiber fixing component 5 is formed smaller than the outer diameter of the plastic optical fiber 3 by about 0.1 to 0.3 mm and the optical fiber claming parts 6 are formed to be the optical fiber pressing parts. On this account, clamping and fixing the plastic optical fiber 3 by the optical fiber fixing component 5 can be conducted with a proper pressure, the plastic optical fiber 3 can surely be fixed and prevented from falling off and an increase in a transmission loss of the plastic optical fiber 3 can be suppressed surely.

Furthermore, according to the embodiment, the bumps and dips were formed in the inner wall surfaces 7 of the optical fiber clamping parts 6 of the optical fiber fixing component 5. Thus, the plastic optical fiber 3 can be prevented from falling off from the optical fiber fixing component 5 further surely and the plastic optical fiber 3 can be fixed and prevented from falling off from the ferrule 1.

Moreover, according to the embodiment, the optical fiber fixing component 5 is formed of plastic and thus damaging the plastic optical fiber 3 can be suppressed more surely. Besides, the optical fiber fixing component 5 can be formed easily at low costs as compared with the case where the optical fiber fixing component 5 is formed of metal.

Additionally, in this embodiment, the ferrule 1 is also formed of plastic and thus the ferrule 1 can be formed at low costs as well.

Furthermore, in this embodiment, in the opening 4 of the ferrule 1, the inner wall surfaces 8 facing to the optical fiber clamping parts 6 of the optical fiber fixing component 5 are formed to be straight surfaces. Thus, the distance between the optical fiber clamping parts 6 of the optical fiber fixing component 5 inserted and fit to the opening 4 can be prevented from spreading inside the opening 4 surely. On this account, the plastic optical fiber 3 can be fixed and prevented from falling off from the ferrule 1 more surely.

Moreover, in this embodiment, the entrance of the opening 4 of the ferrule 1 is formed with the projecting parts 10 for preventing the optical fiber fixing component 5 from falling off. Thus, the optical fiber fixing component 5 can be suppressed from falling off from the ferrule 1 further surely.

As described above, according to the above-described embodiment, the plastic optical fiber 3 can be fixed to the ferrule 1 firmly with a proper pressure. On this account, even though tensility is applied to the plastic optical fiber 3, the plastic optical fiber 3 can be suppressed from falling off from the ferrule 1 surely and an increase in a transmission loss of light transmitting through the plastic optical fiber 3 can be suppressed as well.

A transmission loss and a tensile strength of the plastic optical fiber 3 were in fact determined in the optical fiber fixing structure of the embodiment. The transmission loss was 0.1 dB or under and a tensile strength of 70 N or greater was obtained.

Besides, in the embodiment, fixing the coated plastic optical fiber can be conducted with precision as described above. Therefore, optical communications that can respond to the realization of faster signal transmission rates and increasing communication information throughput inside vehicles or the like, for example, can be conducted with precision with the use of the coated plastic optical fiber.

Figure 5A:
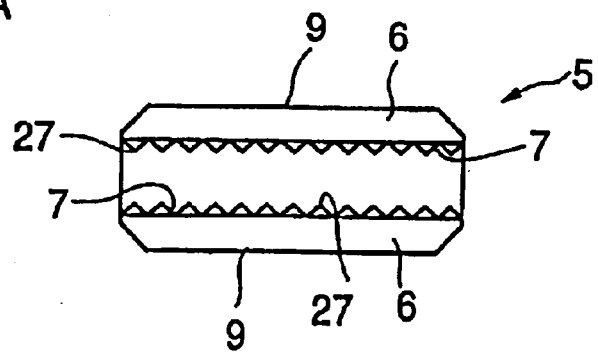
FIGS. 5A and 5B depict illustrations showing another example of the optical fiber fixing component adapted to the optical fiber fixing structure in the invention.

In addition, the invention is not limited to the embodiment, which can adapt various embodiments. For example, the plurality of rectangular bumps 27 was formed in the inner wall surfaces 7 of the optical fiber clamping parts 6 of the optical fiber fixing component 5 in the embodiment. However, as shown in FIG. 5A, a plurality of triangular bumps 27 may be formed in inner wall surfaces 7 of optical fiber clamping parts 6 of an optical fiber fixing component 5 to form bumps and dips in the inner wall surfaces 7.

Figure 5B:
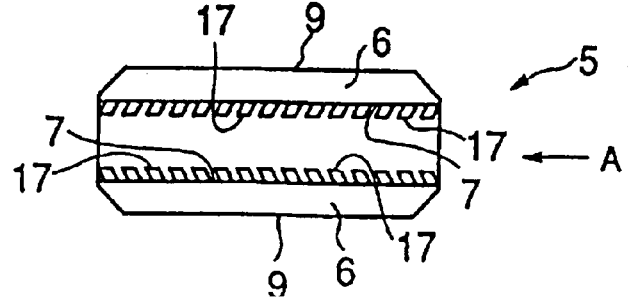
Figure 6A:
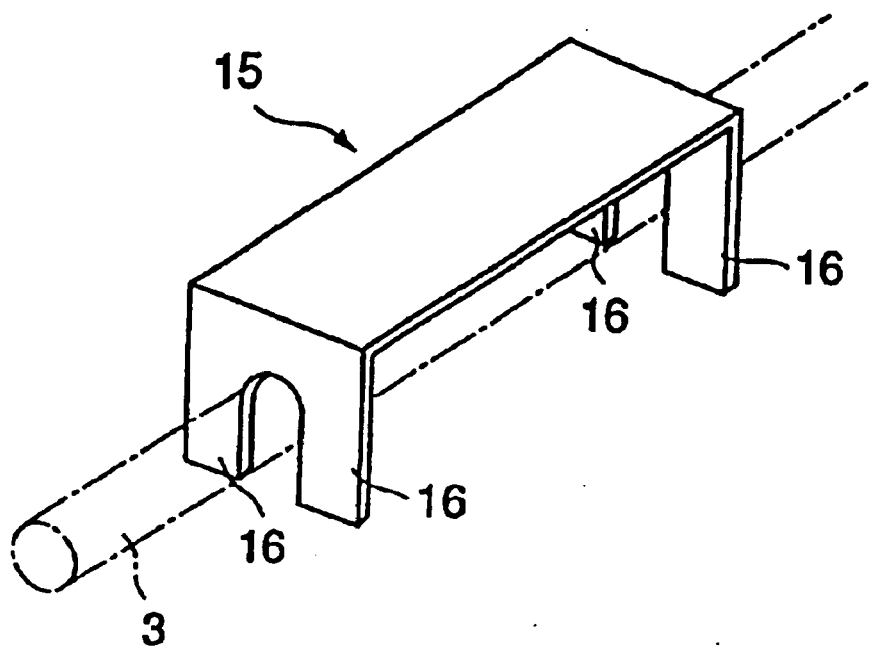
FIGS. 6A and 6B depict illustrations of an optical fiber fixing structure traditionally proposed.
Figure 6B:
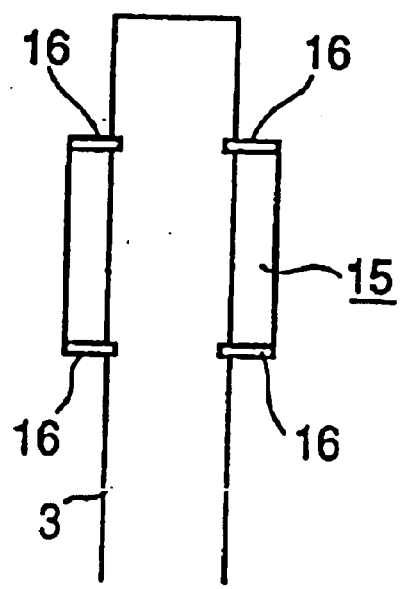

Furthermore, as shown in FIG. 5B, a plurality of fins 17 may be formed in inner wall surfaces 7 of optical fiber clamping parts 6 of an optical fiber fixing component 5 to form bumps and dips in the inner wall surfaces 7, the fins are spaced each other and slantly extended in the direction of inserting a plastic optical fiber 3 (the direction of an arrow A). When it is thus configured, the plastic optical fiber 3 can be suppressed from falling off from the optical fiber fixing component 5 more surely and the plastic optical fiber 3 can surely be fixed and prevented from falling off from the ferrule 1.

Moreover, the optical fiber fixing component 5 is not necessarily formed with bumps and dips in the inner wall surfaces 7 of the optical fiber clamping parts 6. The inner wall surfaces 7 may be formed to be surfaces with no bumps and dips. However, when the bumps and dips are formed in the inner wall surfaces 7, the optical fiber clamping parts 6 clamp a coated optical fiber such as the plastic optical fiber 3 further surely and the coated optical fiber can surely be fixed and prevented from falling off from the ferrule 1.

Besides, in the embodiment, in the opening 4 of the ferrule 1, the inner wall surfaces 8 facing to the optical fiber clamping parts 6 of the optical fiber fixing component 5 were formed to be straight surfaces. However, the opening 4 may be formed to have a size or shape that can insert and fit the optical fiber fixing component 5 and allows the outer surfaces 9 to be pressure welded with the inner wall surfaces of the opening 4.

In addition, in the embodiment, the entrance of the opening 4 of the ferrule 1 was formed with two projecting parts 10 for preventing the optical fiber fixing component 5 from falling off. However, the number of the projecting parts 10 may be one or three or more, or the projecting parts 10 may not be provided. However, when the projecting parts 10 are formed, the optical fiber fixing component 5 can be prevented from falling off from the opening 4 more surely.

Furthermore, in the embodiment, the optical fiber fixing component 5 was formed of plastic, but the optical fiber fixing component 5 may be formed of materials other than plastic. However, plastic has excellent formability, the costs are inexpensive, and there is no risk of damaging the plastic optical fiber 3 in fixing the plastic optical fiber 3. Thus, preferably, the optical fiber fixing component 5 is formed of plastic.

Moreover, in the embodiment, the ferrule 1 was formed of plastic, but the ferrule 1 may be formed of metal. However, as described above, plastic have excellent formability, and the costs are inexpensive. Thus, preferably, the ferrule 1 is formed of plastic.

Besides, the embodiment was configured in which the second sheath 14 on the connection end face side of the plastic optical fiber 3 is exposed and the exposed part of the first sheath 13 is inserted into the ferrule 1. However, it may be configured in which the second sheath 14 of the plastic optical fiber 3 is clamped from both sides between the inner wall surfaces 7 of the optical fiber clamping parts 6 of the optical fiber fixing component 5 without removing the second sheath 14.

Additionally, in the embodiment described above, the ferrule 1 was exemplified as the optical fiber fixture, but the optical fiber fixture may be a component such as a connector. For example, a connector with a locking part for locking into a locked part of a connecting counter part side such as an adapter is formed to be an optical fiber fixture and it can be adapted to a fixing structure for fixing a coated optical fiber such as the plastic optical fiber 3 to the connector. Furthermore, one or a plurality of ferrules as the above-said optical fiber fixture is incorporated into a connector and a coated optical fiber may be fixed to the connector utilizing the ferrules.

Moreover, in the embodiment, the plastic optical fiber was used as the optical fiber, but a glass optical fiber may be used. Any kinds of optical fibers may be acceptable.

Besides, in the embodiment, the shape of the ferrule 1 was a cylindrical shape, but the shapes of the ferrule may be shapes other than a cylinder.

Industrial Applicability

As described above, the optical fiber fixing structure in the invention is suitable for a structure of fixing a coated optical fiber easily without giving damages such that the coated optical fiber is fixed to a proper position or inside a connector.

What is claimed is:

1. An optical fiber fixing structure for fixing a coated optical fiber to an optical fiber fixture, the optical fiber fixing structure characterized in that the optical fiber fixture is formed with an optical fiber insertion hole penetrating from a tip end side thereof to a back end side and an opening communicating from a side of the optical fiber fixture to said optical fiber insertion hole, wherein the coated optical fiber is inserted into said optical fiber insertion hole, an optical fiber fixing component having optical fiber clamping parts facing each other is inserted and fit to said opening as clamping tip end sides of said optical fiber clamping parts are faced to a side of said coated optical fiber, the coated optical fiber is clamped from both sides by the optical fiber fixing component as an outer periphery of said coated optical fiber is clamped between inner wall surfaces of the optical fiber clamping parts facing each other of said optical fiber fixing component, outer surfaces of the optical fiber clamping parts of said optical fiber fixing component are pressure welded with inner surfaces of the opening of said optical fiber fixture, and said coated optical fiber is fixed and prevented from falling off from said optical fiber fixture.

2. The optical fiber fixing structure according to claim 1, characterized in that a space between the optical fiber clamping parts of the optical fiber fixing component is formed smaller than an outer diameter of the coated optical fiber and said optical fiber clamping parts are formed to be optical fiber pressing parts for clamping and holding the coated optical fiber from both sides.

3. The optical fiber fixing structure according to claim 1, characterized in that the optical fiber fixing component is a gutter-like component having a U-shaped cross section where the optical fiber clamping parts are extended from both sides of a base part and faced each other.

4. The optical fiber fixing structure according to claim 1, characterized in that it forms an unbonded clamping and fixing structure where the coated optical fiber is pressure welded and fixed between the optical fiber clamping parts of the optical fiber fixing component without using an adhesive and the optical fiber fixing component is pressure welded and fixed between the inner wall surfaces of the opening of the optical fiber fixture without using an adhesive.

5. The optical fiber fixing structure according to claim 1, characterized in that the optical fiber clamping parts of the optical fiber fixing component are formed with bumps and dips in the inner wall surfaces thereof.

6. The optical fiber fixing structure according to claim 5, characterized in that the bumps and dips in the inner wall surfaces of the optical fiber clamping parts of the optical fiber fixing component are formed to have a plurality of fins that are spaced each other and extended slantly in a direction of inserting the optical fiber.

7. The optical fiber fixing structure according to claim 1, characterized in that the optical fiber fixture is formed to be a cylindrical ferrule or a connector provided with one or more of cylindrical ferrules and a cylindrical bore of said cylinder is formed to be the optical fiber insertion hole.

8. The optical fiber fixing structure according to claim 1, characterized in that in the opening of the optical fiber fixture, inner wall surfaces facing to the optical fiber clamping parts of the optical fiber fixing component are formed to be straight surfaces.

9. The optical fiber fixing structure according to claim 1, characterized in that an entrance of the opening of the optical fiber fixture is formed with projecting parts for preventing the optical fiber fixing component from falling off.

10. The optical fiber fixing structure according to claim 1, characterized in that at least the optical fiber fixing component of the optical fiber fixture and the optical fiber fixing component is formed of plastic.

11. The optical fiber fixing structure according to claim 1, characterized in that the coated optical fiber is a coated plastic optical fiber where a sheath is formed around an outer periphery of a plastic optical fiber strand.

* * * * *

UNITED STATES PATENT AND TRADEMARK OFFICE
CERTIFICATE OF CORRECTION

PATENT NO.   : 6,726,371 B2
DATED         : April 27, 2004
INVENTOR(S)  : Naoki Nishita It is certified that error appears in the above-identified patent and that said Letters Patent is hereby corrected as shown below:

Title page,
Insert Item:
-- Related U.S. Application Data
[63] Continuation of application No. PCT/JP01/08385, filed on September 26, 2001 --

Item [30], Foreign Application Priority Data, please delete "PCT/JP01/08385, filed September 26, 2001."

Signed and Sealed this

Fifteenth Day of February, 2005

JON W. DUDAS
*Director of the United States Patent and Trademark Office*